(12) United States Patent
Bromand

(10) Patent No.: US 11,501,764 B2
(45) Date of Patent: Nov. 15, 2022

(54) APPARATUS FOR MEDIA ENTITY PRONUNCIATION USING DEEP LEARNING

(71) Applicant: Spotify AB, Stockholm (SE)

(72) Inventor: Daniel Bromand, Stockholm (SE)

(73) Assignee: Spotify AB, Stockholm (SE)

( * ) Notice: Subject to any disclaimer, the term of this patent is extended or adjusted under 35 U.S.C. 154(b) by 38 days.

(21) Appl. No.: 16/408,887

(22) Filed: May 10, 2019

(65) Prior Publication Data
US 2020/0357390 A1 Nov. 12, 2020

(51) Int. Cl.
| | | |
|---|---|---|
| G10L 15/187 | (2013.01) | |
| G06N 20/00 | (2019.01) | |
| G10L 13/00 | (2006.01) | |
| G10L 15/06 | (2013.01) | |
| G10L 15/16 | (2006.01) | |
| G10L 15/22 | (2006.01) | |

(52) U.S. Cl.
CPC ............ *G10L 15/187* (2013.01); *G06N 20/00* (2019.01); *G10L 13/00* (2013.01); *G10L 15/063* (2013.01); *G10L 15/16* (2013.01); *G10L 15/22* (2013.01)

(58) Field of Classification Search
CPC ......... G10L 15/22; G10L 15/26; G10L 15/18; G10L 15/063; G10L 15/08; G10L 15/00; G10L 15/02; G10L 15/16; G10L 15/187; G10L 13/00; G10L 2015/088; G10L 25/30; G06N 20/00; G06N 3/02; H04M 2201/40
See application file for complete search history.

(56) References Cited

U.S. PATENT DOCUMENTS

| | | | |
|---|---|---|---|
| 6,078,885 A | 6/2000 | Beutnagel | |
| 6,411,932 B1 | 6/2002 | Molnar et al. | |
| 6,963,841 B2 | 11/2005 | Handal et al. | |
| 7,092,870 B1 * | 8/2006 | Chen | G06F 40/284 704/9 |
| 10,339,920 B2 * | 7/2019 | Adams | G06F 40/263 |
| 2005/0267757 A1 | 12/2005 | Iso-Sipila et al. | |
| 2009/0076821 A1 * | 3/2009 | Brenner | G06F 16/64 707/999.001 |
| 2011/0238407 A1 | 9/2011 | Kent | |
| 2013/0090921 A1 | 4/2013 | Liu et al. | |
| 2014/0222415 A1 | 8/2014 | Legat | |
| 2015/0248881 A1 * | 9/2015 | Holdren | G10L 15/06 704/260 |

(Continued)

OTHER PUBLICATIONS

IBM, "IBM-Cloud-Docs Text-to-Speech," custom-intro.md and custom-rules.md sections, 04a91b523b tree, dated Apr. 9, 2019, Github, https://github.com/ibm-cloud-docs/text-to-speech/tree/04a91b523b5ce0dd0729c0f76c4c29e68953c379 (Year: 2019).*

(Continued)

*Primary Examiner* — Michelle M Koeth
(74) *Attorney, Agent, or Firm* — Merchant & Gould P.C.

(57) ABSTRACT

Methods, systems, and related products for voice-enabled computer systems are described. A machine-learning model is trained to produce pronunciation output based on text input. The trained machine-learning model is used to produce pronunciation data for text input even where the text input includes numbers, punctuation, emoji, or other non-letter characters. The machine-learning model is further trained based on real-world data from users to improve pronunciation output.

20 Claims, 9 Drawing Sheets

(56) References Cited

U.S. PATENT DOCUMENTS

| | | | | |
|---|---|---|---|---|
| 2016/0049144 | A1* | 2/2016 | Conkie | G10L 13/08 |
| | | | | 704/234 |
| 2018/0330729 | A1 | 11/2018 | Golipour et al. | |
| 2019/0080686 | A1 | 3/2019 | Springer et al. | |
| 2020/0349923 | A1* | 11/2020 | Hu | G10L 15/187 |

OTHER PUBLICATIONS

Choudhury, M., Saraf, R., Jain, V. et al. Investigation and modeling of the structure of texting language. IJDAR 10, 157-174 (2007). https://doi.org/10.1007/s10032-007-0054-0 (Year: 2007).*

Oliver Watts, "Unsupervised learning for text-to-speech synthesis," University of Edinburgh, Thesis submitted for the degree of Doctor of Philosophy (2012).

Mathieu Bernard, "Simple text to phonemes converter for multiple languages," GitHub (2015). Available Online at: https://github.com/bootphon/phonemizer.

Bilcu, E. B. "Text-To-Phoneme Mapping Using Neural Networks," Tampere University of Technology, Publication; vol. 759 (2008).

European Search Report for EP Application No. 20170270 dated Sep. 24, 2020 (Nov. 5, 2020), 8 pages.

Google LLC; Hu, Ke et al.; Phoneme-Based Contextualization for Cross-Lingual Speech Recognition in End-To-End Models; U.S. Appl. No. 62/842,571, filed May 3, 2019; 22 pages.

European Communication in Application 20170270.1, dated Dec. 21, 2021, 7 pages.

* cited by examiner

APPARATUS FOR MEDIA ENTITY PRONUNCIATION USING DEEP LEARNING

CROSS-REFERENCE TO RELATED APPLICATION

This application is related to U.S. patent application Ser. No. 16/124,697, which was filed on Sep. 7, 2018, with the title "SYSTEM AND METHOD FOR ASSESSING AND CORRECTING POTENTIAL UNDERSERVED CONTENT IN NATURAL LANGUAGE UNDERSTANDING APPLICATIONS", and which is incorporated herein by reference in its entirety.

TECHNICAL FIELD

The present disclosure relates to automatic speech recognition and natural language understanding, and more particularly to improving systems and methods that assess and correct underserved content in automatic speech recognition and natural language understanding applications through the use of a machine-learning model trained to produce pronunciation output based on text input.

BACKGROUND

Voice and natural language understanding applications rely on being able to understand the content of a users' utterances. But certain types of content are hard to recognize from utterances, such as content containing special characters (e.g., non-alphanumeric characters, emojis, or symbols). This issue appears in various contexts, such as within the names of songs, albums, and artists.

Even certain uses of alphanumeric characters can present challenges. For instance, accessing names of media content items (e.g., by the name of the item or by the name of the artist) can be particularly challenging when the desired content is a homophone of another word or has a non-conventional pronunciation. For example, an artist named "FOCVS" could go by the pronunciation "focus". But uttering the word "FOCVS" with the correct pronunciation for voice processing by a traditional speech-to-text would result in the output "focus" rather than "FOCVS". As a result, a media playback system searching for content based on the output would search for content matching "focus" rather than "FOVCS" and would not return the desired content. In this manner, the media playback system searches for content that transcribes exactly to the utterance according to traditional speech-to-text processing rather than the unconventional pronunciation of the artist's name.

Further, users may pronounce the same content differently. For example, one user may search for a band called "MXMUS" by uttering "maximus", while another user utters each letter M-X-M-U-S, and while another user utters "mix music". Different accents and dialects of users making utterance-based searches present a similar and/or compounding of the problem.

U.S. Pat. No. 6,411,932 describes a system including a training set of word pronunciations and a learner that forms pronunciation guesses for words in the training set.

U.S. Pat. Pub. No. 2013/0090921 describes systems and methods for adding entries to a custom lexicon used by a speech recognition engine of a speech interface. A speech signal is obtained when the user speaks a name of a particular item to be selected from among a finite set of items. After the user has selected the particular item via the means for selecting, the phonetic description of the speech signal is stored in association with a text description of the particular item in the custom lexicon.

U.S. Pat. No. 6,963,841 describes a speech training system that receives audible sound inputs by a user. The audible sound is recognized and converted into a digital representation of the audible sound, and then the digital representation is compared to the digital representations of known audible sounds to determine which audible sound is most likely to be the particular audible sounds being compared to the sounds in the database.

U.S. Pat. Pub. No. 2011/0238407 describes a system and method for receiving an input speech sample in a first language and outputting a translated speech sample in a second language.

SUMMARY

The present disclosure includes systems, methods, and computer readable products for producing pronunciation output based on text input. The systems, methods, and computer readable products of the present disclosure serve a variety of technical advantages and improvements over existing computer technologies and, particularly, over existing computer technologies directed to automatic speech recognition (ASR) and interactions with users that involve ASR, including generating correctly pronounced speech using a text-to-speech system (STT).

In accordance with various embodiments, in an example, there is a computer-implemented method comprising: receiving text data including at least one character that is a non-letter character; providing the text data as input into a trained machine-leaning model; and receiving as output from the trained machine-learning model, output data indicative of a pronunciation of the text data.

In an example, the method further includes training a machine-learning model with training data to form the trained machine-learning model, wherein the training data includes text-based words and associated correct pronunciations. In an example, at least one of the text-based words includes a character that is not a letter of the English alphabet. In an example, the training data includes at least a portion of a text-based word identified as having a pronunciation different than phonetic pronunciation. In an example, training the machine-learning model includes training the machine-learning model to produce pronunciation output based on text input. In an example, the method further includes receiving an utterance from a user; and further training the trained machine-learning model using the utterance. In an example, training the trained machine-learning model using the utterance includes: processing the utterance with a speech to text engine to identify within the utterance at least a first portion and a second portion; conducting a search to find a match to the first portion in a database, the match having associated data; analyzing the associated data to identify a third portion in the associated data that has a similarity to the second portion; and training the trained machine-learning model with the third portion as training input data and the second portion as training output data. In an example, the method further includes identifying a media content item associated with the match; and initiating playback of the media content item. In an example, the training data includes training output data based on a standardized phonetic representation of a spoken language. In an example, the standardized representation is the International Phonetic Alphabet (IPA), Speech Assessment Methods Phonetic Alphabet (SAMPA), Extended SAMPA (X-SAMPA), or the Speech Synthesis Markup Language (SSML). In an example, the training output data is formatted as a vector representation. In an example, the trained machine-learning model comprises a neural network. In an example, the method includes providing the output data to a text-to-speech system for producing speech output based on the output data. In an example, there is a system comprising a memory storing instructions that, when executed by one or more processors, cause the one or more processors to perform the method. In an example, the system further includes media streaming application instructions stored in a non-transitory memory of a voice-interactive device executable to cause operation of a media streaming application on the voice-interactive device.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers.

DETAILED DESCRIPTION

The example embodiments presented herein include systems, methods, and non-transitory computer-readable medium products for processing content with non-standard phonetic pronunciations. Such techniques include the use of machine-learning models to process such content to provide a pronunciation as output. Disclosed examples have practical applications in improving a computer's capability of interacting with a user. Improvements can include improving the ability of a computer to, in response to an utterance, identify media content based on associated text content. In some examples, the associated text content can be referred to as a "name entity" or "entity" and can include, for example, a title of a track or album, the name of an artist or a band, or the title of a playlist, among other text content. Disclosed examples can be particularly useful where the name entity has multiple possible pronunciations or non-standard pronunciations (e.g., correctly identifying the band "AC/DC" in response to the utterance "A-C-D-C" despite the utterance not including a sound representing the "/"). Improvements can also include the ability of a computer to vocalize content (e.g., correctly pronouncing "÷" as "divide" when vocalizing "now playing ÷"). This is for convenience only, and is not intended to limit the application of the present invention. After reading the following description, it will be apparent to one skilled in the relevant art how to implement the following disclosure in alternative embodiments.

In accordance with an example, a system uses a machine-learning model configured to provide pronunciation output from input content. For instance, the machine-learning model can analyze input content on a sound-by-sound basis and provide possible pronunciations of the input content. Examples can include breaking down content into individual component phonemes, which are perceptibly distinct sound units of a given language. In examples of uniquely pronounced terms, several characters of textual content of the terms can be associated with one or more phonemes that result in different pronunciations from a typical pronunciation used in the English language (or any other language).

Media Content System

Figure 1:
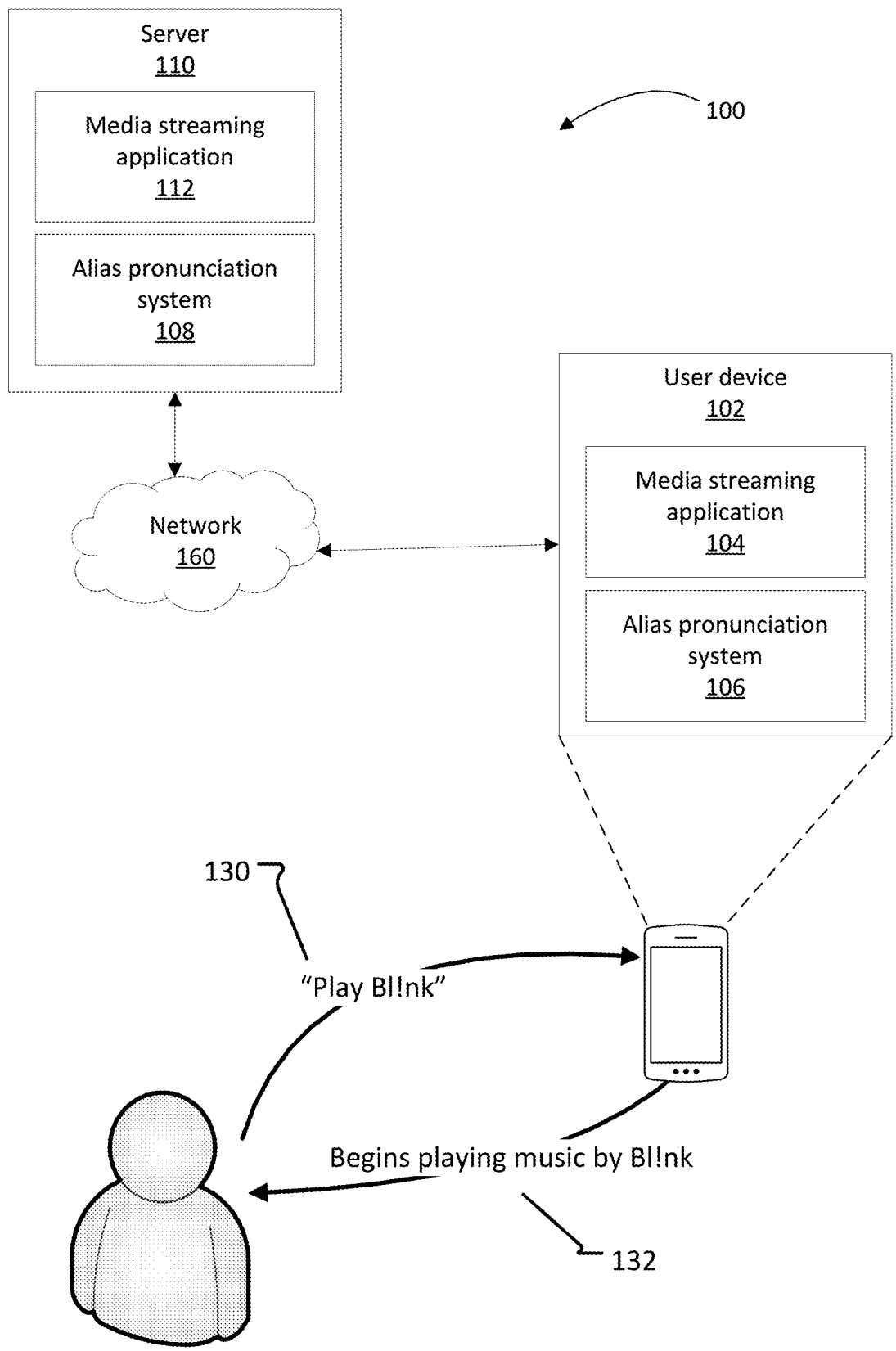
FIG. 1 illustrates an example media content system that uses a machine-learning model to recognize utterances and provide a response.

FIG. 1 illustrates an example media content system 100 that uses a machine-learning model 107 to recognize utterances and provide a response. The media content system 100 includes a user device 102 that is connected to a server 110 over a network 160. The user device 102 and the server 110 include various components usable to perform one or more operations described herein, including receiving an utterance 130 and providing a result 132. As shown, the result 132 is playing music as requested by the user in the utterance 130. Other results can be provided, such as providing a spoken phrase. Other embodiments can include more or fewer components and/or interactions.

The media content system 100 provides capability for the user device 102 to interact with the user. Common interactive activities include the user device 102 receiving utterances 130 from the user, processing the utterances 130, and providing a result 132 to the user (e.g., playing various media content items for user that correspond to the utterance 130). The media content system 100 can be implemented at least partially in a personal living space (e.g., an apartment or home), at a place of business, or a mobile environment (e.g., a vehicle, such as a car or bus). The server 110 is often located remote from the user device 102.

The user device 102 is a computing device operable to cause playback of media content items. The user device 102 can provide voice content to the user, such as vocalized responses to the utterances 130 from the user, produced by a text-to-speech component. In many examples, the user device 102 includes one or more processor devices and a computer-readable medium device coupled to the one or more processor devices, which is described in more detail below. The computer-readable medium device includes instructions that, when executed by the one or more processor devices, cause the one or more processor devices to perform various methods or processes, such as those described herein relating to providing a synthesized voice generated by a text-to-speech component of a voice-enabled computer system for user interaction and the playback of media content items. Broadly, the user device 102 includes components configured to receive vocal communications from the user, such as one or more microphones. User device 102 also typically includes a speaker for providing audio output or is configured to communicate audio signals to external speakers that provide audio output.

The user device 102 includes media streaming application 104. Typically, the media-streaming application 104 is a third-party application, however, in alternate implementations, media-streaming application 104 is a first-party application. Generally, the media-streaming application 104 provides functionality to the user device 102 and typically communicates with one or more servers (e.g., the server 110) via the network 160. The media streaming application 112 can also reside at least in part on the server 110. The media-streaming application 104 can take the form of media-streaming application instructions stored on a computer readable medium and executable by one or more processors to provide media-streaming functionality described herein.

The user device 102 also includes an alias pronunciation system 106. The alias pronunciation system 106 is a third-party system; however, in alternative implementations, alias pronunciation system 106 is a first-party system. An "alias" is data representing a pronunciation of a term or phrase. An alias can take a variety of forms including representation using ASCII characters (even if the alias itself is represented in another format such as UNICODE), such as representing the pronunciation of "AC/DC" as "A C D C". Generally, the alias pronunciation system 106 functions to receive and decipher utterances from a user. Server 110 can also include an alias pronunciation system 108. A machine-learning model 107 can be stored as part of or in conjunction with the alias pronunciation system 106, 108. The alias pronunciation system 106 can take the form of alias pronunciation application instructions stored on a computer readable medium and executable by one or more processors to provide alias pronunciation functionality described herein. Additional details regarding the alias pronunciation system 106, 108 are described elsewhere herein, including in relation to FIG. 3.

The machine-learning model 107 can be implemented using any of a variety of different kinds of artificial intelligence or machine learning frameworks. The machine-learning model 107 is trainable provide useful output based on an input. The machine-learning model 107 can include one or more of: a neural network, a deep learning, or a regression framework. One or more aspects of the machine learning techniques used herein may be implemented using machine learning toolkits, including but not limited to: TENSORFLOW by GOOGLE INC. of Mountain View, Calif.; OPENAI GYM by OPENAI of San Francisco, Calif.; or MICROSOFT AZURE MACHINE LEARNING by MICROSOFT CORP. of Redmond, Wash. Some examples, the machine-learning model 107 can include a plurality of different artificial intelligence frameworks. Each of the different artificial intelligence frameworks may be customized for a particular purpose. In an example, the machine-learning model 107 is configured to receive, as input, a vector representing the characters of text for which pronunciation is desired (e.g., a vector of an artist name) and the output is a vector representing a pronunciation of the name in a desired format. The pronunciation can be used as an alias of the name.

In some examples, there may be multiple, different machine-learning models 107. For instance, there may be different machine-learning models 107 for use in different parts of the world to address regional differences in pronunciation. For instance, there may be a machine-learning model 107 trained based on training data specific to British English, American English, or other region dialects. Where a region- or dialect-specific pronunciation is requested, a corresponding machine-learning model is selected for use.

Hardware and/or software platforms manage operation of the user device 102. The software platform includes an application programming interface (API) stored locally or remotely. The API includes instructions for how various third party software applications, such as the media streaming application 104, can leverage various functionalities provided by user device 102. In addition, the API can limit the functionalities accessible by third party application.

The user device 102 receives input from the user and provides a result or output to the user. In many examples, the user device 102 includes a combination of hardware and software components. The user device 102 can include visual components (e.g., displays for visual output and cameras for visual input), audio components (e.g., speakers for audio output and microphones for audio input), tactile components (e.g., haptic feedback actuators for tactile output and buttons for tactile input), and combinations thereof. In many examples described herein, the user device 102 provides a result 132.

It should be appreciated that the user device 102 need not be a single physical unit or structure but could itself comprise a system of interconnected hardware, firmware, and software. Thus, for example, the user device 102 corresponds to a combination of a smart phone or specialized hand-held device that is connected (through a hard connection or wireless connection) to an automobile's speakers. In other examples, the user device 102 is communicatively linked or linkable to hardware in another system such as a home system, an office system, a vehicle system, or a system for use in a location where media playback is desirable.

In some embodiments, the user device 102 does not include a display screen. Alternatively, in some embodiments, the user device 102 includes a display screen that can be touch sensitive. The user device 102 can be, for example, a personal computer system, handheld entertainment device, tablet device, smartphone, television, audio speaker, in-car entertainment system, or other type of electronic or media device that is adapted or able to prepare media content for presentation, control the presentation of media content, and/or play or otherwise present media content.

The user device 102 can include one or more components for communicating with one or more other devices or systems over the network 160.

The network 160 is an electronic communication network. The network 160 can include the Internet, an intranet, a wide area network (WAN), a local area network (LAN), and a virtual private network (VPN), cellular network connections, and connections made using protocols such as 802.11a, b, g, n and/or ac, among other kinds of communication networks or combinations thereof.

The server 110 is a computing device remote from the user device 102. The server 110 can receive and process communications from the user device 102. In many examples, the server 110 is a computing device of the media delivery system. The server 110 can be part of a media content provider (e.g., a media streaming service). In an example the server 110 streams, progressively downloads, or otherwise communicates media content items to the user device 102 for playback. The server 110 includes, or has access to, one or more databases.

In some examples, the server 110 includes multiple server devices. The multiple server devices can be owned, managed, and/or controlled by separate entities. Various actions performed by one or more servers can include analyzing user communications, performing party-specific actions, accessing and/or transmitting media content, and the like. As an example, a first server is specific to the user device 102, and the first server manufacturers, receives, and processes communications from the user device 102. The first server can determine whether certain communications relate to third party software and can transmit those communications to a second server that is specific to the third party software.

FIG. 1 also shows an example interaction between the user and the user device 102. In the interaction, the user device 102 outputs a result 132 for the user. In the example shown, the result 132 is playback of music requested by the user. As shown, the utterance 130 includes a request for music by an artist named "bl!nk", which includes a character ("!") that is a non-letter character. The user device 102 receives the utterance 130, processes the utterance, and determines the result 132 based on the utterance 130 (e.g., a pronunciation of the utterance). The processing of the utterance 130 can benefit from output from the machine-learning model 107, including through one or more techniques described herein. Then, the media streaming application 104 plays a media content item associated with the artist. Although the English language is used herein, the techniques described herein can be applied to variety of different alphabets and languages. Techniques can be particularly applicable to situations where a name (e.g., of an artist or song) includes one or more characters that are not contained within the alphabet of the language associated with a voice system.

In addition to benefitting from the machine-learning model 107, the interaction between the user and the user device 102 can also be used to benefit the machine-learning model 107 by providing training data. In the example shown, the utterance 130 is the utterance "Play Bl!nk", where "Bl!nk" is pronounced as "blink". This utterance 130 can be used as training data to train the machine-learning model 107 at the alias pronunciation system 106, 108 about such alternative pronunciations. As one example, if the band name "Bl!nk" was included in the training data, then the machine-learning model 107 would learn that an exclamation mark character can be pronounced with the "ih" sound (e.g., the machine-learning model 107 would have modified weights tending to correspond "!" with the pronunciation "ih"). As a result, when the machine-learning model 107 receives input of other terms that include an exclamation mark (e.g., "s!nk"), the machine-learning model 107 would be more likely to produce an output indicating that the pronunciation of the term includes the "ih" sound. As a specific example, the text "bl!nk" can be used as training data and a phonetic representation of the utterance can be used as the label to be applied to the data. This results in the data-label pair: {"bl!nk", [blink]$^P$}, where [bl!nk]$^P$ is a phonetic representation of the word "bl!nk". In an example, the phonetic representation can include representation using letters of an alphabet (e.g., "blink", which includes letters from the modern English alphabet). In other examples, the phonetic representation can use a standardized representation of a spoken language, such as the INTERNATIONAL PHONETIC ALPHABET (IPA) (e.g., as maintained by the INTERNATIONAL PHONETIC ASSOCIATION), which provides a standard way of identifying sounds (phonemes), Speech Assessment Methods Phonetic Alphabet (SAMPA) (e.g., as developed and maintained by the Department of Speech, Hearing and Phonetic Sciences, University College London), Extended SAMPA (X-SAMPA) (e.g., as also developed and maintained by the Department of Speech, Hearing and Phonetic Sciences, University College London), or SPEECH SYNTHESIS MARKUP LANGUAGE (SSML) as defined by the WORLD WIDE WEB CONSORTIUM.

Figure 2:
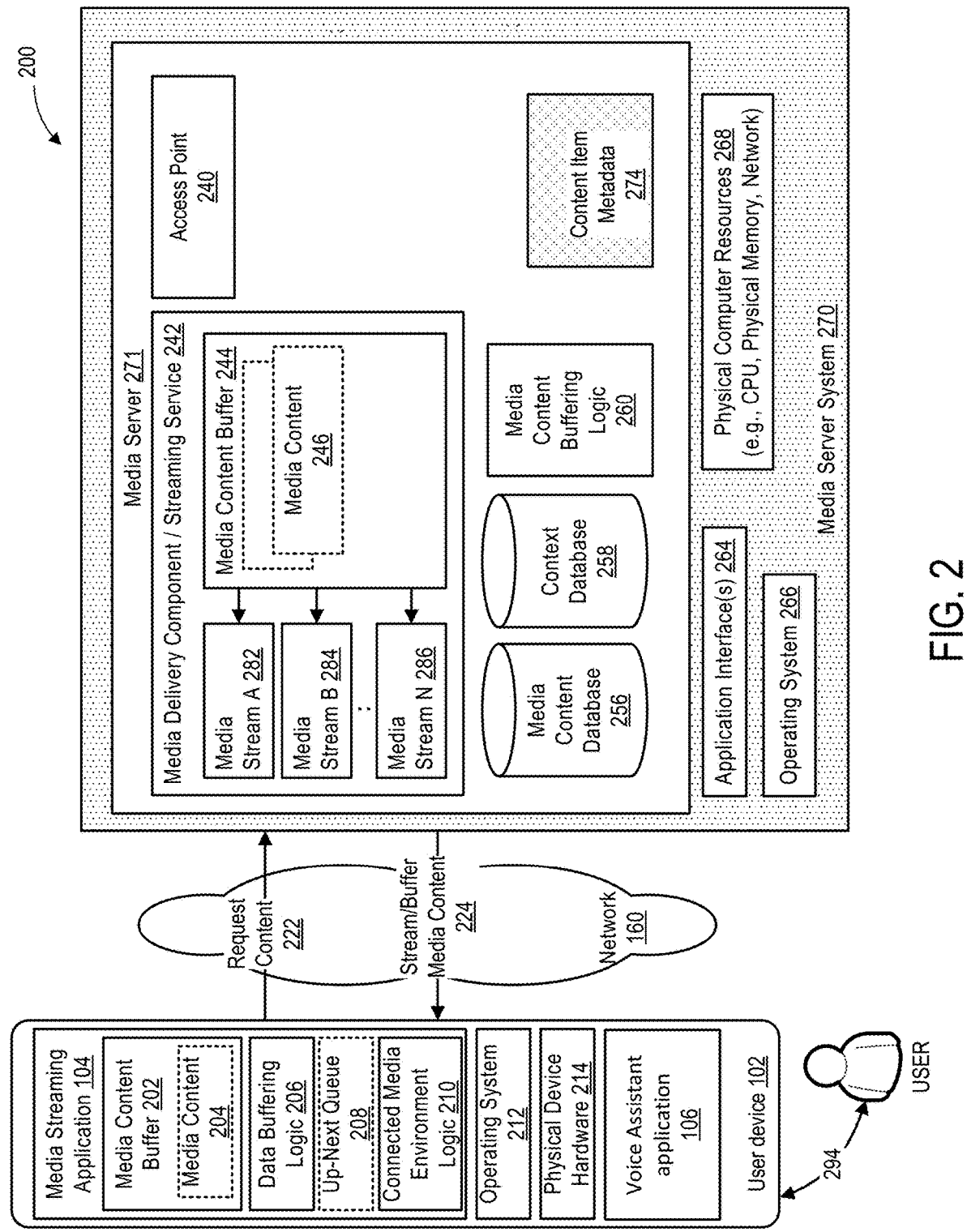
FIG. 2 is a schematic block diagram of an example digital media content system to provide media content to a user.

FIG. 2 is a schematic block diagram of an example digital media content system 200 to provide media content to a user. The user can interact with the user device 102. The user device 102 can issue requests to access media content at a media server 271, for example, to stream music, video, or other forms of media content to the user device 102. In response, the media server 271 can populate a media content buffer 244 with corresponding items of media or sponsor-directed content, for example as one or more streams of media content and/or advertisement or other sponsor-directed content. The media server 271 can also communicate the selected media content to the user device 102.

The user device 102, operating as a client device, receives and plays media content provided by the media server system 270, or by another system or peer device. In the embodiment shown, the media server system 270 is one of the servers 110 shown in FIG. 1. Additionally, the media server system 270 handles requests for media received from the media streaming application 104.

The user device 102 and the media server 271 can include, respectively, one or more physical device or computer hardware resources 214, 268, such as one or more processors (CPU), physical memory, network components, or other types of hardware resources. The user device 102 and the media server 271 include, respectively, an operating system 212, 266 or other processing environment.

Although for purposes of illustration the user device 102 and the media server 271 are shown, the media server system 270 can support simultaneous use of a plurality of user devices 102. Similarly, the user device 102 can access media content 204, 246 provided by a plurality of media servers 271, or switch between different media streams provided by one or more media servers 271.

The user device 102 can optionally interact with a touch-enabled or other type of display screen having a user interface. Example display devices include smart phones, tablet computing devices, and televisions. The user interface is adapted to display media options, for example as an array of media tiles, thumbnails, or other format, and can determine a user interaction or input. Selecting a particular media option, for example a particular media tile or thumbnail, can be used as a command by a user and/or the media device, to the media server, to download, stream or otherwise access a corresponding particular media content item or stream of media content 224.

The user device 102 also includes a software media streaming application 104, together with an in-memory client-side media content buffer 202, and a client-side data buffering logic or software component 206, which can be provided as software or program code that is executable by a computer system or other processing device, and which can be used to control the playback of media content received from the media server 271, for playing either at a requesting user device 102 (e.g., a controlling device) or at a user device 102 (e.g., a controlled device), in the manner of a remote control.

A connected media environment logic or software component 210, which can be provided as software or program code that is executable by a computer system or other processing device, can be provided at the user device 102, either as part of the media streaming application 104, or separately, for example as a firmware, to enable the user device 102 to participate within a connected media environment (e.g., a SPOTIFY CONNECT environment) that enables a user to control the playback of media content at such controlled devices.

The client-side data buffering logic, together with the media content buffer 244, enables a portion of media content items, or samples thereof, to be pre-buffered at the user device 102. For example, while media options are being prepared for play on a user interface (e.g., as media tiles or thumbnails, their related media content can be pre-buffered at the same time) and cached by one or more user devices 102 in their media content buffers, for prompt and efficient playback when required.

The media server system 270 can include an operating system 266 or other processing environment, which supports execution of a media server 271 that can be used, for example, to stream music or other forms of media content to the user device 102, or to a controlled device.

The media server 271 can provide a media streaming service 242 (e.g., a subscription-based media streaming service), for which the user device 102 or user can have an associated account and credentials, and which enable the user device 102 to communicate with and receive content from the media server 271. A received media-access request from the user device 102 can include information such as, for example, a network address, which identifies a destination user device 102 to which the media server 271 should stream or otherwise provide media content 246, in response to processing the media-access request.

A user may own several media devices operable as the user device 102, such as a smartphone and an audio speaker, which can play media content received from the media server 271. Identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

One or more application interface(s) 264 can receive requests from the user device 102 to retrieve media content 246 from the media server 271. A context database 258 can store data associated with the presentation of media content by the user device 102, including, for example, a current position within a media stream that is being presented by the user device 102, or a playlist associated with the media stream, or one or more previously-indicated user playback preferences.

The media server 271 can transmit context information associated with media content 224 to the user device 102 that is presenting that stream, so that the context information can be used by the user device 102, and/or displayed to the user. The context database 258 can be used to store a current media state of the user device 102 at the media server 271, and synchronize that state between other devices. Alternatively, media state can be shared in a peer-to-peer manner. For example, the user device 102 is aware of its own current media state, which is then synchronized directly with other peer devices.

When the destination user device 102 to which the media content 246 is being streamed changes from a controlling device to a controlled device or from a first controlled device to a second controlled device, then the media server 271 can transmit context information associated with an active media content to the newly-appointed destination device, for use by that device in playing the media content.

The media content database 256 can include media content, for example, music, songs, videos, movies, or other media content, together with metadata describing that media content. The metadata can be used to enable users and user devices 102 to search within repositories of media content, to locate particular media content items.

A server-side media content buffering logic or software component 260 (e.g., provided as software executable by a processing device) can be used to retrieve or otherwise access media content items, in response to requests from the user device 102 or other systems, and to populate the media content buffer 244, at a media delivery component or the media streaming service 242, which can be similarly provided as software or program code that is executable by a computer system or other processing device, with streams 282, 284, 286 of corresponding media content data, which can then be returned to the requesting device or to a controlled device.

The user device 102, media server systems 270, and/or controlled devices, can communicate with one another using the network 160, such as via the Internet, a local area network, peer-to-peer connection, wireless or cellular network, or other form of network.

The user's selection of a particular media option can be communicated to the media server 271, via an application interface 264 of the server. The media server 271 can populate the media content buffer 244, with corresponding media content 246 including one or more streams 282, 284, 286 of media content data, and can then communicate the selected media content to the user device 102, or to a controlled device as appropriate, where it can be buffered in a client-side media content buffer for playing at the device.

As further described below, the digital media content system 200 can include a server-side media gateway or access point 240, provided as software or program code that is executable by a computer system or other processing device, or other process or component, which operates as a load balancer in providing access to one or more servers, for use in processing requests at those servers. The digital media content system 200 can enable communication between the user device 102 and a media server 271, via an access point 240 at the server, and optionally the use of one or more routers, to allow requests from the user device 102 to be processed either at that server and/or at other servers. For example, in an example media content system, a media player operating on a user device can connect to various back-end processes via an access point that forwards client requests to other servers, such as sending one or more metadata proxy requests to one of several metadata proxy machines, on behalf of the client or end user.

The media streaming application 104 can operate with the media server 271 to maintain a queue data structure, referred to herein as an up-next queue 208, which indicates one or more items of media content 204 as determined by a current playlist, and/or media stream A 282, that are scheduled to be played at the user device 102.

Figure 3:
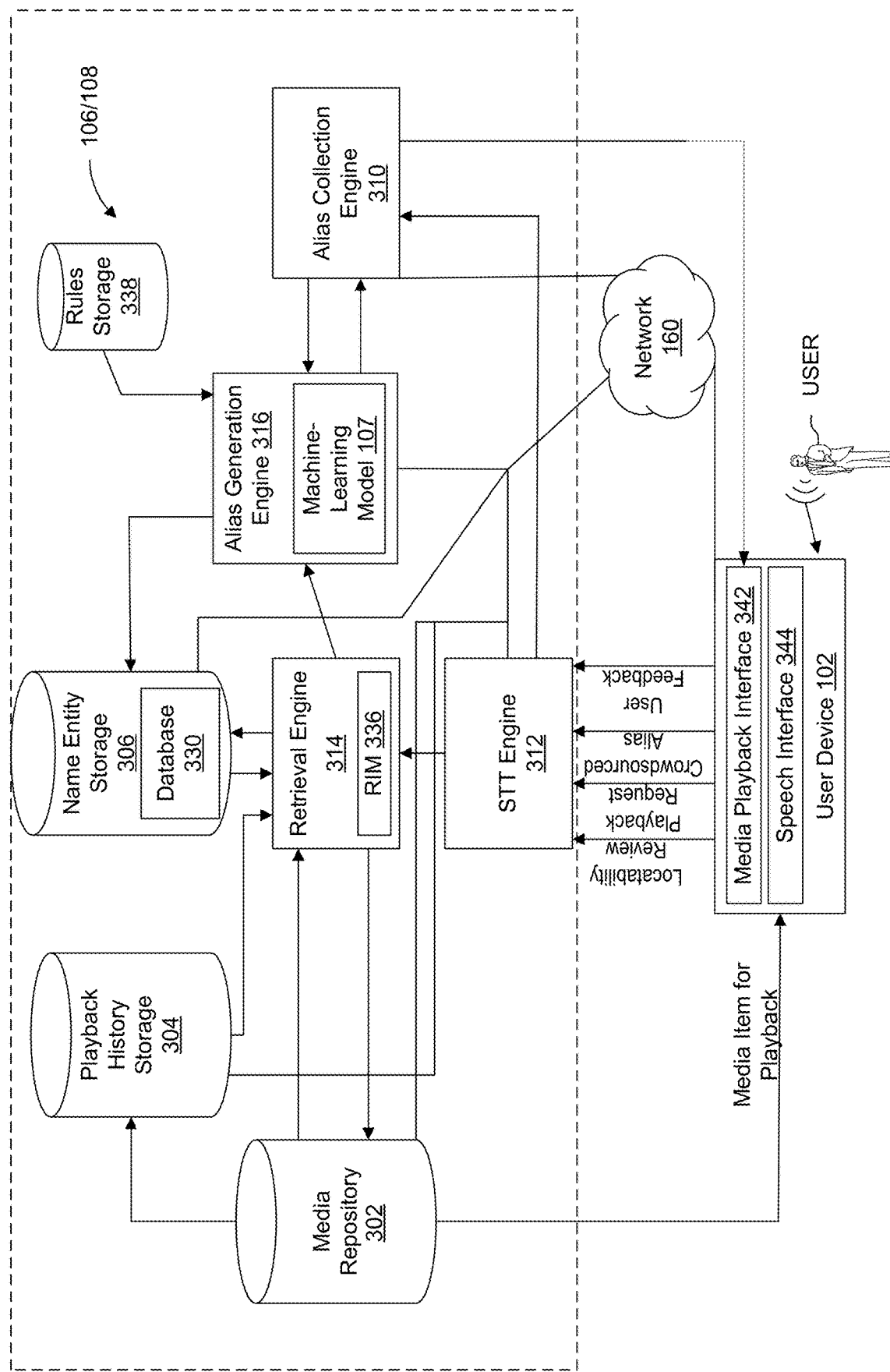
FIG. 3 schematically illustrates components of an example alias pronunciation system.

FIG. 3 schematically illustrates components of an example alias pronunciation system 106, 108 in accordance with the present disclosure. The various components are communicatively coupled, such as via the network 160. The components of the alias pronunciation system 106, 108 can reside in a single location or across multiple locations. For example, all of the components can reside in the user device 102 or in the server 110. In another example, the components of the alias pronunciation system 106, 108 reside in two or more devices, such as the user device 102 and the server 110.

The alias pronunciation system 106, 108 includes a media repository 302, a playback history storage 304, a name entity storage 306, an alias collection engine 310, a speech-to-text (STT) engine 312, a retrieval engine 314, an alias generation engine 316, a media playback interface 342, and a speech interface 344. In some examples, the media playback interface 342 and the speech interface 344 are associated with the same or different devices (e.g., the user device 102). In some examples, the user device 102 includes one or more additional interfaces.

It should be appreciated that the media repository 302 can include multiple storage devices (e.g., databases) in one or more locations. Similarly, the name entity storage 306 can include multiple storage devices (e.g., databases) in one or more locations. Similarly, the playback history storage 304 can include multiple storage devices (e.g., databases) in one more locations. Alternatively, one or more of the media repository 302, the name entity storage 306, and/or the playback history storage 304 can correspond to a single storage device (e.g., a central server database or other memory).

In an example playback mode of the alias pronunciation system 106, 108, the user utters a command such as "play 'Close Your Eyes' by Bl!nk," which is captured by the speech interface 344. The speech interface 344 includes a microphone, which converts the natural speech into an analog signal. The analog signal is then converted into a digital signal (using one or more analog to digital converters). The digital signal is then sent to the STT engine 312 for processing.

The STT engine 312 transcribes the digital signal corresponding to the captured natural speech into text. In some examples, the text is the textual representations of the words expressed by the utterance. In other examples, the text represents the pronunciation of the words expressed by the utterance (e.g., the phonemes uttered). The STT engine can be implemented in any of a variety of ways. In an example, the automated speech recognition is preformed using hidden Markov models or neural networks. Examples of existing speech-to-text systems CMU SPHINX, maintained by CARNEGIE MELLON UNIVERSITY, DEEPSPEECH, maintained by the MOZILLA FOUNDATION, and GOOGLE ASR maintained by Google Inc.

In an example transcription process, the STT engine 312 translates the speech signal into sound units called phonemes, and then maps the phonemes to words using a stored lexicon of words. In some examples, the context of the words is also used to infer the correct transcription. For example, if the phonemes translated from "Close Your Eyes" are imprecise or unclear due to poor transmission or an accent of the user, the transcription of "Close Your Eyes" by the STT engine 312 may be informed by "by Bl!nk" since "Close Your Eyes" and "Bl!nk" often co-occur in a playback utterance. In this manner, the STT engine 312 provides a probabilistic transcription based on the available information, and the probability improves as the STT engine 312 learns from experience what words co-occur and at what frequencies. The STT engine 312 can also learn stylizations of specific users. That is, the STT engine 312 learns how to correctly map phonemes depending on the person that has uttered them, thereby taking into account users' individual accents, dialects, rhythm, pace, and other speech characteristics. The STT engine 312 can also learn from feedback (e.g., an input indicating that a particular transcription was correct or incorrect). Thus, in some examples, the STT engine 312 is adapted to access historical records of transcriptions to improve the probability of performing an accurate transcription in the present. Over time, the speech recognition provided by the STT engine 312 improves at least with respect to words that have conventional spellings and pronunciations.

The speech recognition of the STT engine 312 can improve with respect to words that do not have conventional spellings or pronunciations, or include non-letter symbols by dissecting the individual phonemes within an utterance. As described in more detail below, the STT engine 312 can use a comparative approach when encountering a phoneme that it does not recognize, or receives feedback that the interpretation is incorrect.

The transcribed playback request is passed to the retrieval engine 314. Using a retrieval engine 314, the retrieval engine 314 maps the transcribed request to a media item by identifying one or more entities in the transcription. For example, if the STT engine 312 provides the transcribed text "Play 'Close Your Eyes' by Bl!nk" the retrieval engine 314 parses the text, identifies the name entity "Bl!nk," and then looks up the name entity in the name entity storage 306. In some examples, the name entity storage 306 includes a database 330 having entries that map each media item stored (e.g., using the media item identifier) in the media repository 302 to one or more name entities and/or one or more aliases associated with the media item identifier (ID). The retrieval engine 314 then passes the returned media item ID associated with the name entity to the media repository 302, where the media item associated with the media item ID is identified and then played back, such as via the playback interface 342 (e.g., a speaker, a display screen, etc.) of the user device 102.

A record of the playback is stored in the playback history storage 304. The playback record includes the ID of the media item played back and the retrieval modality employed by the user to obtain that particular playback. The record of the playback is encrypted when stored in the playback history storage 304. Example retrieval modalities include utterance (i.e., natural speech) and entered text.

The retrieval engine 314 also includes a retrieval improvement module (RIM) 336. The RIM 336 is configured to ascertain under-locatable name entities associated with media content items stored in the media repository 302. When the RIM 336 is active, the alias pronunciation system 106, 108 operates in a retrieval optimization mode. It should be appreciated that the alias pronunciation system 106, 108 can operate in both retrieval optimization mode and playback mode at the same time. In some examples, the retrieval engine 314 and the RIM 336 are configured to operate asynchronously in order to improve the operating efficiency of the alias pronunciation system 106, 108 and reduce overall processing times.

The RIM 336 is triggered by any of a number of triggering events, some examples of which will now be described. In one example, a user-entered command (e.g., entered via the user device 102) triggers operation of the RIM 336. For instance, a user specifically requests that the RIM 336 perform a specific or general locatability review. In another example, the RIM 336 is programmed to undergo preset periodic locatability reviews of name entities associated with media content items stored in the media repository 302. In another example, the RIM 336 is triggered by a user feedback following a media item retrieval (e.g., playback) request. For example, a user feedback of "not the track I wanted" in response to a playback of a media item ensuing from an uttered playback request triggers the RIM 336 to perform a locatability review of the played back media content item and/or of the correct media content item (e.g., if the user feedback includes a typed entry of the correct media item that was desired).

The term "locatability" can sometimes be referred to as "findability" and relates to the relative difficulty in locating a particular media content item, such as whether the media content item is "under-locatable" or "locatable". Generally, an "under-locatable" or "underserved" media content item is one that is deemed to be too difficult or too unlikely to locate by machine voice-driven retrieval of a syntactically sufficient utterance designed to locate (e.g., in order to playback) that media content item. If a media content item is not under-locatable then it is "locatable," meaning that it is not too difficult or too unlikely to locate the media content item by machine voice-driven retrieval of a syntactically sufficient utterance designed to locate (e.g., in order to playback) that media content item. More specific definitions of what makes a media content item under-locatable or locatable will be described below in connection with the methods and systems of the present disclosure that identify under-locatable content.

A locatability review to detect whether a media item is under-locatable is performed by the RIM 336 and can be specific to one or more particular media items, or more general, e.g., performed across the entire collection of media items in the media repository 302.

For a given review, (whether specific or general) the RIM 336 selects a first media item from the media repository 302 by an item ID of the first media item. The RIM 336 then interrogates the playback history storage 304, and counts the total number of past playbacks of the media item, as well as the number of past playbacks of the media item retrieved using the selected name entity via an utterance retrieval modality.

In at least some examples, the playback records are retrieval specific. For instance, the item ID associated with each playback record is the item ID that corresponds to the scope of the retrieval request that prompted the playback. Thus, for example, if a track X is part of an album Y, then the playback record of album Y (indicating that a user requested playback of album Y) will have a different item ID in its playback record than a playback of track X by itself (indicating that a user requested playback of track X), even though the playback of album Y includes a playback of the track X. The media item track X may be under-locatable while the album Y that contains track X may be locatable; thus, it is advantageous to differentiate playback records according to the scope of the request that caused their playback.

In an example, the alias collection engine 310 generates an output that appears as text on a user interface. The text includes the name entity of the media item (in an example, "2L8" or "2L8 by Running") and invites the user to utter the name entity, the utterance being received through the interface. For example, the text reads: "Say 'play 2L8 by Running" once. The crowd-sourced utterances are then transmitted via the speech interface 344 of the user device 102 (or another user device) to the STT engine 312, which transcribes the crowd-sourced utterances and provides them to the alias collection engine 310. The alias collection engine 310 then populates the alias column 806 (shown in FIG. 7) of the database 330 with the collected transcribed aliases and returns the updated task item to the alias generation engine 316. In some examples, in order for a crowd-sourced transcribed alias to populate the alias column 806, it must have occurred at least a predefined minimum number of times.

For example, in response to receiving, for each of two aliases, at least a predefined minimum number of responses to crowd-sourcing pronunciations for "2L8", the alias collection engine 310 populates the alias column 806 of the database 330 with "too late" and "too-el-ate" corresponding to two crowd-sourced pronunciation aliases. It should be appreciated that each alias can be represented in the alias column 806 in more than one way (e.g., as alternative but equivalent or at least substantially equivalent spellings to ensure that minor variations in speech transcription by the STT engine 312 are nevertheless mapped to the appropriate alias).

It should be appreciated that aliases can be collected without crowd-sourcing. For example, specific user accounts can be targeted to provide aliases, or the artists themselves can be targeted to provide aliases.

The alias collection engine 310 passes the updated database 330 to the alias generation engine 316. In some examples, the alias generation engine 316 then classifies the content item and populates the classification column 808 with one or more tags corresponding to the classification. In some examples, the alias generation engine 316 classifies the content item based at least in part on the aliases that have been collected. In some examples, the alias generation engine 316 classifies the content item based at least in part on the name entity of the content item. In still further examples, the alias generation engine 316 classifies the content item based at least in part on the aliases that have been collected and comparing the collected aliases from the alias column 806 to the one or more name entities from the name entity column 804.

For example, the alias generation engine 316 compares the aliases "too late" and "too-el-ate" to the name entity "2L8" and determines that the media item should be classified as "Numbers". Non-limiting examples of classifications will be described below.

In some examples, the alias generation engine 316 uses the classifications and/or aliases for one or more name entities to generalize rules for determining aliases for other name entities without the need for crowd-sourcing pronunciations. In some examples, the rules are stored in a rules storage 338 (e.g., a database), and accessed by the alias generation engine 316. For example, using 2L8's aliases and classification, the alias generation engine 316 generates a rule stored in the rules storage 338 for determining a generalized alias for "Numbers" name entities in which a number in the name entity is phonetically spelled out. The alias generation engine 316 can then use the stored rule to generate one or more aliases for another media item having a name entity classified as "Numbers" and containing a number. Thus, it should be appreciated that, in some examples, the alias generation engine 316 generates one or more aliases for a detected under-locatable name entity without using the alias collection engine 310 to collect aliases by crowd-sourcing or another collection means.

In some examples, the alias generation engine 316 and/or the retrieval engine 314 uses one or more rules to directly classify a particular name entity and provide that classification to the database 330 independently of generating or collecting any aliases for that name entity. For example, the retrieval engine 314 identifies a character in a name entity that is not a letter, and the media item associated with that name entity is correspondingly tagged in the classification column 808 of the database 330.

In examples, the alias generation engine 316 uses the machine-learning model 107 to generate pronunciations or aliases for name entities. For instance, the alias generation engine 316 can iterate through the name entities in the name entity storage 306 as input into the machine-learning model 107 store the output as aliases in association with the name entities to thereby improve lookup.

When the system receives a confirmation of a pronunciation or a new pronunciation (e.g., from the machine-learning model 107), the database 330 in the name entity storage 306 is then updated to include the collected and/or generated aliases associated with the content item ID. Subsequently, when the alias pronunciation system 106, 108 is in playback mode a transcribed uttered playback request is compared by the retrieval engine 314 to the name entity and any associated aliases of that name entity when identifying in the database 330 a content item ID corresponding to the playback request. For example, a subsequent transcribed uttered request to "play too late" is correctly mapped to the name entity 2L8 and its corresponding content ID in the database 330 using the collected or generated alias "too late".

As described above, once a name entity has been classified the media item associated with that name entity is tagged with the one or more classifications. For example, the database 330 is updated with the classification tag or tags, which is then used to update the classification column 808.

Name entities that have been so tagged can inform generalizable alias generation by the alias generation engine 316. In addition, name entities that have been so tagged can inform the RIM 336 at least in part as to whether a particular media item is locatable or under-locatable. For example, if there is limited data from which the RIM 336 can calculate an utterance resolve frequency for a given media item but the data that is available suggests that the media item is under-locatable, the RIM 336 can nevertheless determine that the media item is locatable if the name entity associated with the media item does not fall within any predefined classifications known to be associated with under-locatability.

In addition, the alias pronunciation system 106, 108 uses the pronunciation provided by the user to as training data to improve how the machine-learning model 107 generates pronunciations. For instance, the pronunciation of the name entity "Bl!nk" can be used to train the machine-learning model with respect to the pronunciation of an exclamation point. Such training can be useful in generating pronunciations for other name entities that include an exclamation point. Additional details regarding this process are described below in relation to FIG. 4.

Training and Using Machine-Learning Model

Figure 4:
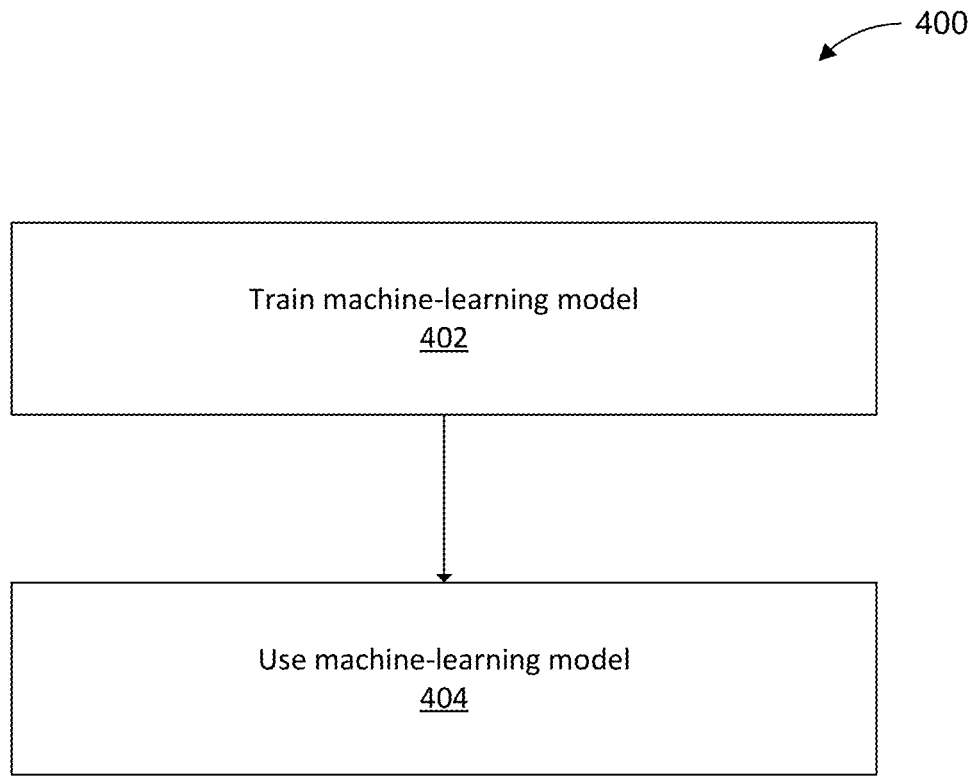
FIG. 4 illustrates an example method of training a machine-learning model and then using the machine-learning model to predict pronunciations of non-letter characters within text.

FIG. 4 illustrates an example method 400 of training a machine-learning model 107 and then using the machine-learning model 107 to predict pronunciations of non-letter characters within text. The method 400 can begin with operation 402.

At operation 402, the machine-learning model 107 is trained with training data. This operation 402 can include obtaining training data. The training data includes text-based words and their associated pronunciations. The text-based words include at least one character that is not a letter of the English alphabet. The training data can be obtained from a variety of different sources including but not limited to the third party data sources, such as databases or libraries that store pronunciation data. In examples, the training data includes at least a portion of a text-based word identified as having a pronunciation different than phonetic pronunciation. For instance, a human or automated curator can tag a text-based word as having a pronunciation that is different from a phonetic pronunciation.

Next, the machine-learning model 107 is trained using the training data. For instance, the training input data is inputted into the machine-learning model 107 to train the machine-learning model 107 to produce pronunciation output based on text input. The particular methods of training can vary depending on how the machine-learning model 107 is implemented. In general, the training includes, providing a training input to the machine-learning model 107 and obtaining a resulting output. Another method of training includes supervised learning, where an input is mapped to an output based on an example input-output pair. The resulting output is then compared to a training output corresponding to the training input. Weights, settings, or other attributes of the machine-learning model 107 are then modified based on a loss function (e.g., a difference between the resulting output and the training output) to train the model. The model is trained for a number of iterations until the loss function is sufficiently small. After a desired amount of training, the machine-learning model 107 is validated (e.g., testing the machine-learning model 107 with known input-output pairs to determine if the model is sufficiently trained) and, if successfully validated, the machine-learning model 107 can be used in production. Additional details regarding operation 402 are shown and described in relation to FIG. 5. Following operation 402, the flow of the method 400 can move to operation 404.

In an example, training the machine-learning model 107 includes using a supervised-learning model. Examples of input-output pairs provided in a supervised-learning model are provided below.

live [ "l I v] verb
live [ "l aI v] adjective
project [ "p r A: . dZ E k t] noun
project [ p r 169 . "dZ E k t] verb
invite [ I n . "v aI t] verb
invite [ "I n . v aI t] noun
record [ "r E . k 3: d] noun
record [ r I . "k O: r d] verb In an example, training the machine-learning model 107 includes training the machine-learning model 107 using an utterance 130 from a user. For example, the training can include processing the utterance 130 with a speech-to-text engine to identify within the utterance 130 at least a first portion and a second portion. For instance, where the utterance 130 is, phonetically (e.g., as output produced by a speech-to-text engine), "play close your eyes by blink", the first portion can be "close your eyes" and the second portion is "blink". The portions can be identified by, for example, the retrieval engine 314. Next, a search is conducted to find a match to the first portion in a database. For instance, the retrieval engine 314 can search for the first portion in the name entity storage 306 (e.g., the database 330 thereof) for name entities matching the first portion. A resulting match can have associated data. For instance, the resulting match can be an entry in the name entity storage 306 having the title "close your eyes" and be associated with an artist having the name entity "bl!nk". The name entity "bl!nk" can be the associated data because it is data associated with the resulting match found in the database. Next, the associated data is analyzed to identify a third portion in the associated data that has a similarity to the second term. For instance, the name entity "bl!nk" can be compared to the second portion "blink" and be determined that they have a similarity that passes a threshold. The similarity can be determined based on, for example, a number of characters that are the same between them passing a predetermined threshold. Next, the machine-learning model 107 is trained with the third portion as training input data and the second term as training output data. For instance, "bl!nk" is provided as training input with "blink" (or a phonetic representation thereof) being the expected training output. This training process can further improve the performance of the machine-learning model 107 by incorporating additional training data based on real-word use by a user. For instance, such an instance can further include identifying a media content item associated with the match, retrieving the audio associated with the media content item; and initiating playback of the media content item.

At operation 404, the machine-learning model 107 is used to produce pronunciations for input text. In an example, the machine-learning model 107 can be used to produce pronunciations for text data in a metadata database or name entities in the name entity storage 306. For instance, text data is received that includes at least one character that is not a letter of the English alphabet. The text data is provided as input into a trained machine-learning model 107, and output data indicative of a pronunciation of the text data is received as output. For instance, the alias generation engine 316 iterates through one or more name entities in the name entity storage 306 (e.g., the text data), provides each of the one or more name entities as input into the machine-learning model 107 to produce a pronunciation output, and then stores the pronunciation output as an alias in association with the name entity. Then the stored pronunciation output can be used to facilitate searches for content. For example, when a user requests a particular band, such as by saying "play close your eyes by bl!nk", the system can conduct a search for "close your eyes", and find a song or album called "close your eyes" by an artist named "bl!nk" having an alias of [blink]$^A$, where [blink]$^A$ is a phonetic representation of the word "blink" as generated by the machine-learning model 107 or textual representation of the phonetic representation of the word "blink". Based on the extent to which a match is found, the system can cause playback of "close your eyes" by "bl!nk". Additionally, the system can then associate the word "bl!nk" with the pronunciation by the user for use as training data for refining the model. For instance, data representative of the user's utterance of "bl!nk" (e.g., a vector representing the user's pronunciation) can be used as training output data (e.g., a label to be trained) and the spelling of "bl!nk" can be used as training input data to train the machine-learning model. The trained machine-learning model 107 can then be used to predict future pronunciations, such as for a band named "s!nk."

In another examples, the trained machine-learning model 107 can be used to implement a Text-To-Pronunciation (TTP) service. The TTP service can be used to facilitate proper pronunciation by a text-to-speech system of the media content system 100. For example, the media streaming application 104 may receive the utterance "play AC/DC" from the user, process the phrase (e.g., as described above), and then provide the response "now playing AC/DC". To ensure proper pronunciation of the artist, the media streaming application (or another part of the media content system 100) can provide at least part of the response text to the alias pronunciation system 106 (e.g., to the machine-learning model 107 thereof) as input. The alias pronunciation system 106 can take the input, provide it to the trained machine-learning model 107 and obtain a phonetic pronunciation of the input. Then phonetic pronunciation can then be provided as output from the alias pronunciation system 106 and provided to a speech vocalization system for vocalizing as audio output to the user.

Training Machine-Learning Model

Figure 5:
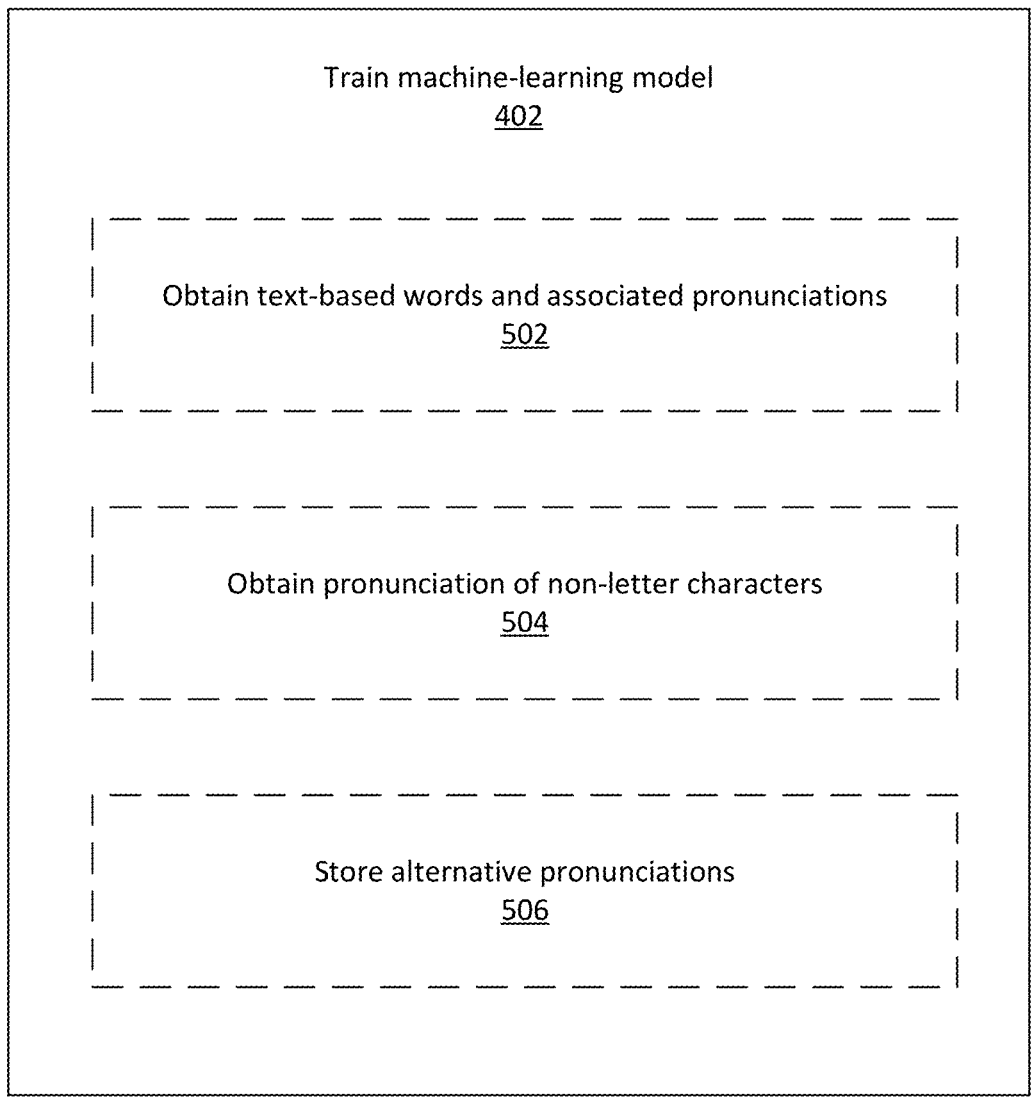
FIG. 5 illustrates a more detailed method of training a machine-learning model.

FIG. 5 illustrates a more detailed method 402 of training a machine-learning model. The machine-learning model 107 can be trained in any of a variety of ways. In an example, the machine-learning model 107 is trained to produce a pronunciation from an input text (e.g., providing the output "blink" from the input "bl!nk") or providing a potential spelling from an input pronunciation (e.g., providing the output "bl!nk" from the input "blink"). The method can begin with operation 502.

At operation 502, text-based words, such as name entities, and their associated standard pronunciations are obtained. As used herein, "text-based word" refers to a textual representation of words, such as name entities. It should be understood that the term "text" is used for convenience and may refer to, for example, alpha characters, numeric characters, alphanumeric characters, AMERICAN STANDARD CODE FOR INFORMATION INTERCHANGE (ASCII) characters, symbols, or foreign language UNICODE (e.g. UTF-8). In many examples herein, name entities (e.g., artist names, song titles, album titles, and other text data associated with media content) are represented as text-based words. For instance, when a media streaming application is displaying the name of a currently-playing artist, album, and song, that media streaming application is representing the name as text-based words. The standard pronunciation is metadata regarding how the text-based words are typically pronounced. The standard pronunciation can be represented in a standardized representation of a spoken language, such as IPA or SSML. For use in processing with machine-learning models, the text-based words and the standard pronunciations are converted into a format usable by a machine-learning model, such as a vector representation.

The formatted standard pronunciation is used as training output data that corresponds to the training input data, and the formatted text of the words being pronounced is used as the training input data. For instance, a vector representation of the text "bl!nk" is used as training input data having corresponding training output data that is a vector representation of the pronunciation of the text "bl!nk" (e.g., a vector representation of the text "blink"). In some alternate embodiments, the model is trained in the opposite way: the text of the words is used as training output data (e.g., "AC/DC") and the pronunciation is provided as the input data (e.g., "A-C-D-C").

The training data can be used to train the model 107 to provide output data for input that is not in the training data. As one example, if the band name "Bl!nk" was included in the training data, then the model learns that an exclamation mark can be pronounced with the "ih" sound. As a result, when the model encounters other terms that include an exclamation mark, such as "S!nk," the model can produce output that includes the pronunciation of the exclamation mark as an "ih" sound, even if "S!nk" was not in the training data.

The machine-learning model 107 can also be trained using text-to-pronunciation (TTP) services. TTP services receive an input text, such as "live at Wembley Stadium" and returns the SAMPA representation that will be used later by a text-to-speech system to properly pronounce the text. In another example, when ingesting information, the record labels (and/or artists) are given the option to hear how the text is being pronounced. If the text is pronounced wrong by the system, then it can be corrected. This also allows different pronunciations of the text to be prioritized.

Still further, the machine-learning model 107 can be trained using crowd sourced data. In an example, when the voice enabled computer system includes voice recognition technology, the utterances provided by users can also be processed to further train the machine-learning model with alternative pronunciations.

At operation 504, pronunciations of non-letter characters is obtained. In examples, the training data can be supplemented with data linking individual characters to individual pronunciations. In a first example, text-based words including non-letter characters is included in the training data. In yet another embodiment, pronunciations of the non-letter characters, as stand-alone symbols is included in the training data. For example, the symbol "▲" may be included in the training data with an associated pronunciation as an "a." In some examples, the training data can be on a smaller scale than entire name entities, such as on an individual syllable, phoneme, or character level. In examples, the training data includes single character training data (e.g., just the character '!' and its pronunciation) or a multi-character training data (e.g., the character '!' and the context around the character to form the training data "1 !n"). The pronunciations of non-letter characters are used to train the model using any of the techniques described above.

At operation 506, alternative pronunciations are stored for later use. In an example embodiment, when the training data includes multiple pronunciations, the pronunciations may be ranked. The symbol "▲" includes a first pronunciation as an "a," a second pronunciation as "alpha," and a third pronunciation as "triangle." The first pronunciation is the most common, so the machine-learning model 107 uses that pronunciation to make a first prediction. For example, the machine-learning model 107 can produce an output indicating the probability that each of several pronunciations is correct.

Using Machine-Learning Model

Figure 6:
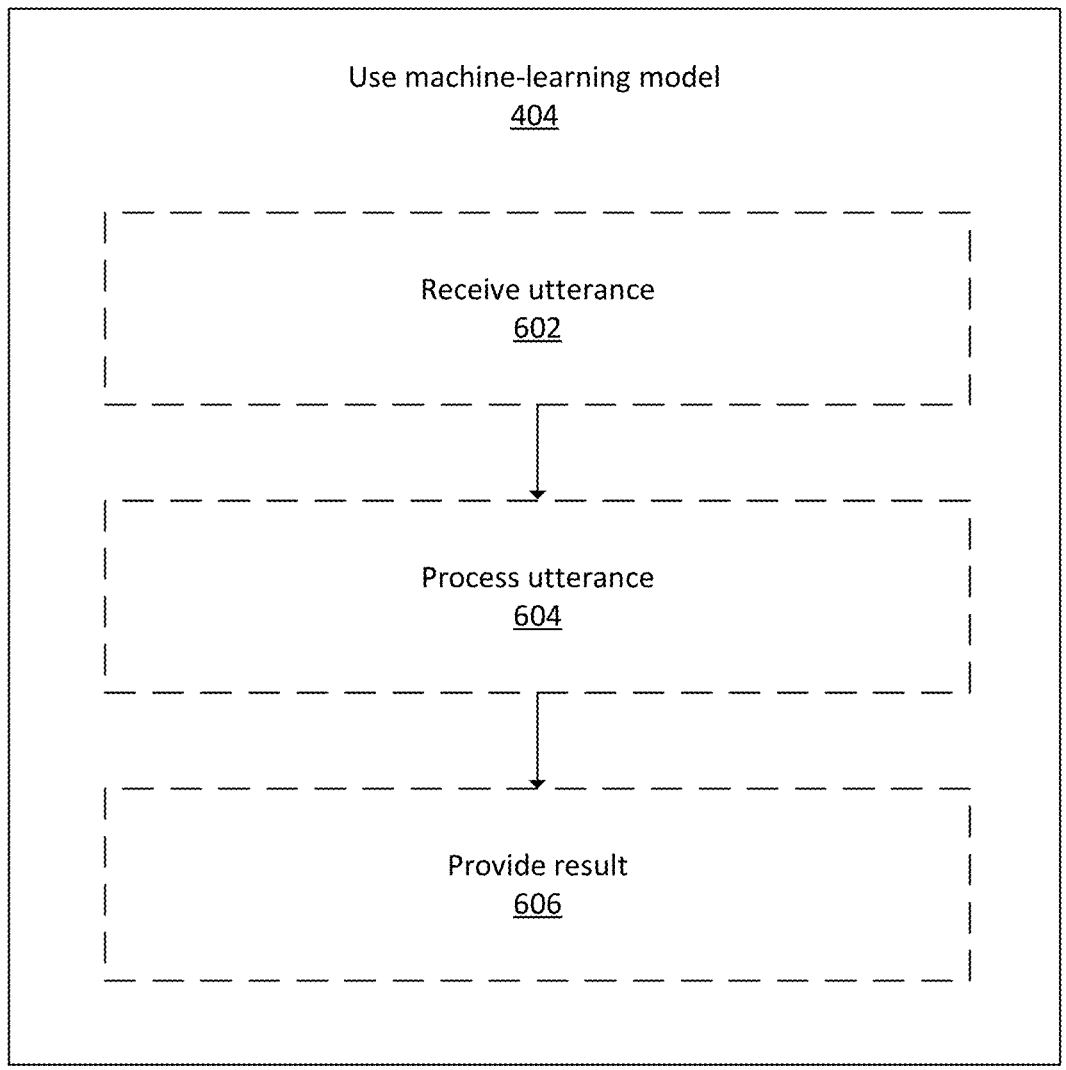
FIG. 6 illustrates a more detailed method of using the machine-learning model to provide a result based on an utterance.

FIG. 6 illustrates a more detailed method 404 of using the machine-learning model to provide a result based on an utterance. The method 404 can begin with operation 602.

At operation 602, an utterance 130 is received from a user. In an example, the utterance 130 is a command from the user for the media-streaming service to play a specific song. However, the utterance 130 can be any type of request, response, command, or other communication between a user and the user device 102. The utterance 130 can be received in any of a variety of forms, such as an audio waveform or as resulting text from a speech-to-text system. Following operation 602, the flow of the method 404 can move to operation 604.

At operation 604, the utterance 130 is processed to determine a result to provide. For instance, where the utterance is "play AC/DC" (pronounced as "play A-C-D-C"), the service determines that the result 132 will be playback of music associated with the band AC/DC. The result 132 can be determined based on looking up content in a database based on possible pronunciations. The possible pronunciations can be determined using techniques described elsewhere herein. In an example, each artist is stored in association not only with the text of their name (e.g., "bl!nk") but also one or more aliases (e.g., one or more possible pronunciations, such as "blink"). In another example, the artist portion the utterance is processed by a machine-learning model 107 trained to produce possible alternative names based on the utterance. For instance, the word "blink" can be provided to the model and the result "bl!nk", which can then be searched in a media content data store. Following operation 604, the flow can move to operation 606.

At operation 606, a result 132 is provided to the user. The result 132 is a desired result determined using various techniques, including those described in operation 604 and elsewhere herein. For example, if the utterance 130 is a request to play a specific song to be played, the result 132 is to play the specific song. If the utterance 130 is a question, the result 132 is an answer to the question. A subsequent utterance can be used to determine whether the result 132 is correct or incorrect. For instance, if the user does not otherwise indicate that the result provided to the user is not correct, the result (and by extension an output of the machine-learning model 107) can be determined to be correct. However, if the user indicates that the result 132 is incorrect, a new result 132 can be generated. When the machine-learning model 107 provides a correct result, information relating to that correct result can be stored for future use (e.g., use in training data)

Name Entity Storage Database

Figure 7:
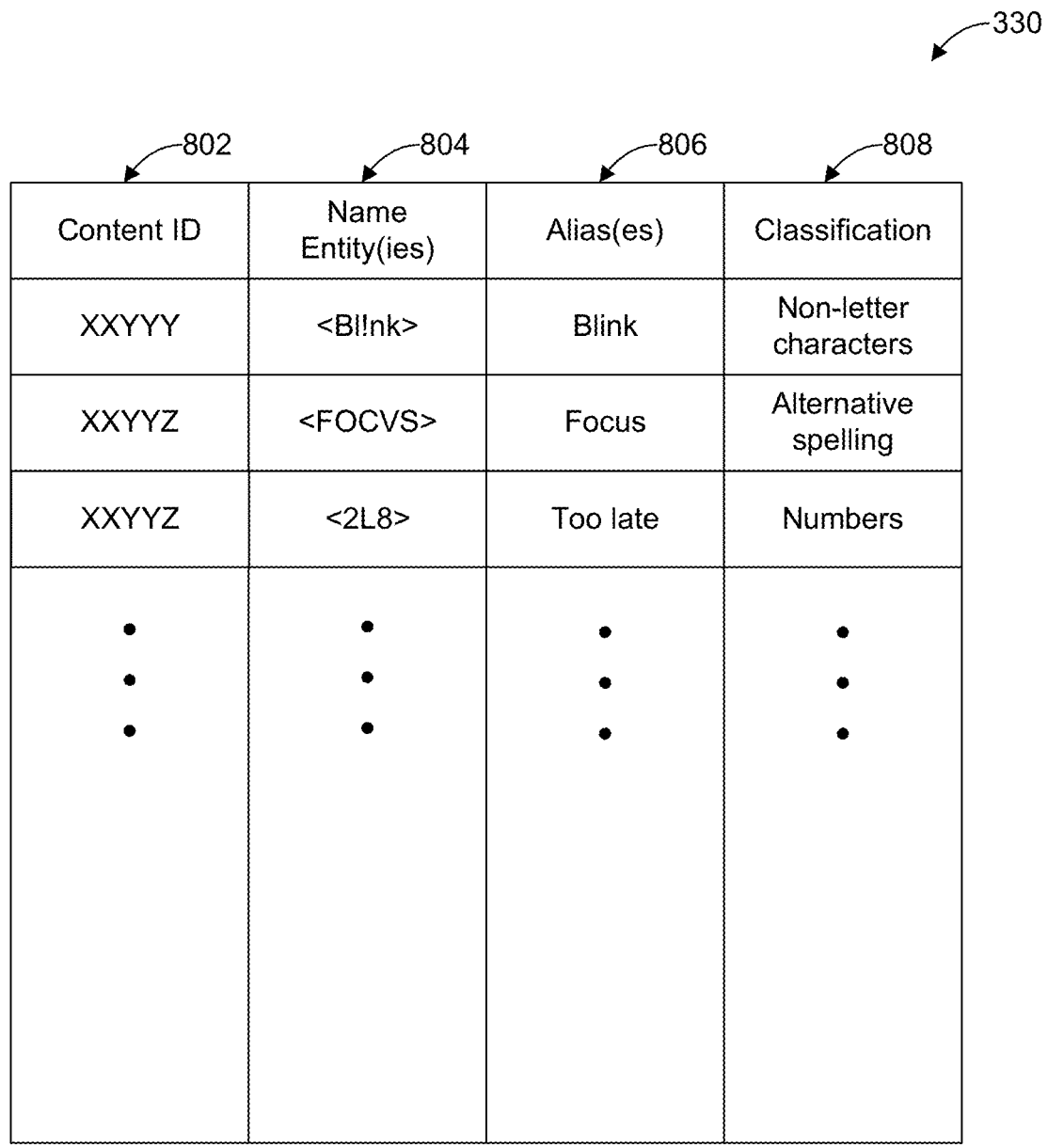
FIG. 7 illustrates an example embodiment of a database.

FIG. 7 illustrates an example embodiment of the database 330 is illustrated in FIG. 3. The database 330 includes a content ID column 802, a name entity column 804, and an alias column 806. Optionally, the database 330 also includes a classification column 808. A content ID is located by retrieval engine 314 by matching up the corresponding name entity or alias to a transcribed utterance in the table 230.

In examples, a text-to-speech engine can use the alias column 806 to determine the proper pronunciation of content. For example, when providing audio output for a name entity, rather than providing the name entity itself (e.g., "bl!nk") as input to a text-to-speech system, a corresponding alias from the alias column 806 is provided instead, which can result in more natural and accurate sounding voice output.

The following classifications of media content name entities are non-limiting and for illustration purposes only. As mentioned, in some examples, the alias generation engine 316 generates one or more aliases for a name entity at least in part based on the name entity's classification.

One example name entity classification is English dialects and neologisms. In this classification, a name entity uses one or more new words that may contribute to a dialect or that are spelled in a way intended to convey a certain dialect of English speech. An example is the name entity "She Da Best". The determiner "da" in "She Da Best" is spoken distinctly from the Standard American English equivalent "the". Typical machine voice-driven retrieval systems can fail to correctly form this dialect speech and often change it to Standard American English.

Another example name entity classification is abbreviations and ambiguous acronyms. Abbreviations and ambiguous acronyms consist of name entities that include shortened or abbreviated words in their titles or textual cues that imply abbreviation or acronym. An example of a true acronym name entity is "B.Y.O.B.". Abbreviations are often ambiguous in their pronunciation. An example of an ambiguous name entity is "BILD". While "BILD" may be intended solely as an alternative spelling (for "build"), users may interpret the capitalization cues to imply that they should pronounce each letter individually.

Another example name entity is classification is numbers, dates, and times, examples being the name entity "$2^{nd}$ Birthday". Similar to the abbreviations class, there is a risk of users resorting to utterances having multiple textual representations of the same spoken phrases. For example, "$2^{nd}$ Birthday" could also be transcribed as "Second Birthday". Similarly, times can be represented in different ways, e.g., 'seven hundred hours' may be uttered instead of 'Seven AM' or '7 o'clock'. Similarly, dates can be represented in different ways, e.g., '7/11' could be 'Seven eleven', 'July Eleventh', or 'November Seventh'.

Another example name entity is classification is removal of spaces. Removing spaces in name entities can present challenges for machine voice-driven retrieval, such as in the name entity "TREEFALL". Removing spaces can prevent a transcribed utterance from being mapped to the appropriate name entity.

Another example name entity classification is vocables. Vocables are utterances that are not words but do contain meaning. Commonly used examples in everyday language are 'uh-huh' to agree with something and 'ew' to express disgust. Many lexicons of automatic speech recognition systems do not include many vocables, thereby causing a name entity including such a vocable to be under-locatable.

Another example name entity classification that can cause under-locatability of that name entity is non-replacement symbols, i.e., name entities containing one or symbols e.g., for conveying a specific feeling, such as the name entity $Opportunity$.

Another example name entity classification that can cause under-locatability of that name entity is orthographically and semantically similar replacement symbols, such as name entities that use the symbol "▲" instead of an "A".

Another example name entity classification that can cause under-locatability of that name entity is expressive and alternative spellings. Alternative spellings are not intended to modify the pronunciation of the word. For example, "Bild me up" is still intended to be pronounced the same as "Build me up". Alternative spellings may cause under-locatability because the actual name entity can be substantially different from the transcription that the automatic speech recognition system produces. Combinations of alternative spelling and dialects may be particularly challenging to locate.

Another example name entity classification that can cause under-locatability of that name entity is wordplay, such as homophones, puns and portmanteau. For example, the artist "Intheno" may be under-locatable by an automatic speech recognition system that transcribes a corresponding playback request as "in the know".

Yet another example name entity classification is non-letter characters. Non-letter characters include symbols, emojis, numbers, punctuation marks, and other similar characters. For example, "bl!nk" is pronounced as if the exclamation point is an "I".

Another example name entity classification that can cause under-locatability of that name entity is proper nouns due to the plurality of spelling and pronunciation differences commonly used.

Device

Figure 8:
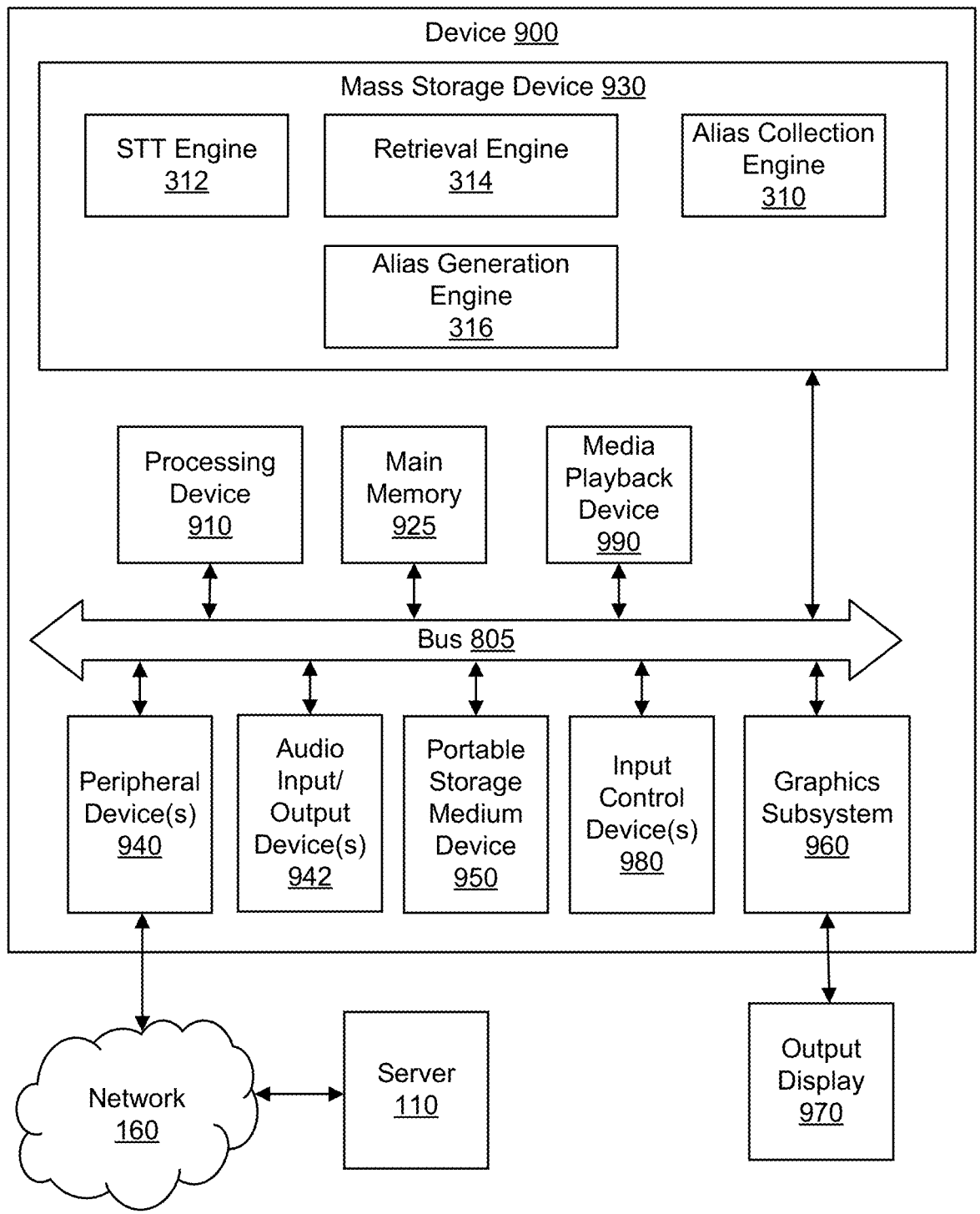
FIG. 8 is a block diagram showing an exemplary device constructed to realize one or more aspects of the example embodiments described herein.

FIG. 8 is a block diagram showing an exemplary device 900 constructed to realize one or more aspects of the example embodiments described herein. In some examples, the device 900 corresponds to the user device 102. In these examples, the device 900 may be connected over the network 160 to one or more servers 110 or other remote devices. The one or more servers 110 can include one or more components described below in relation to the device 900, including a mass storage device and a processor device. That is, various operations and processes described herein can be performed by the cooperation of two or more devices, systems, processes, or combinations thereof. Such a division of operations provides for efficient use of computing resources because servers are generally more powerful than the user device 102.

The device 900 includes a processing device 910 (e.g., a central processing unit). Also included are a main memory 925 and an interconnect bus 805. The processing device 910 may include without limitation a single microprocessor, or may include a plurality of microprocessors for configuring the device 900 for media content retrieval and improvement. The main memory 925 stores, among other things, instructions, and/or data for execution by the processing device 910. The main memory 925 may include banks of dynamic random access memory (DRAM), as well as cache memory.

The device 900 may further include a mass storage device 930, peripheral device(s) 940, audio input/output device(s) 942 (e.g., a microphone, speaker), portable non-transitory storage medium device(s) 950, input control device(s) 980, a media playback device 990 (e.g., a speaker), a graphics subsystem 960, and/or an output display 970. For explanatory purposes, all components in the device 900 are shown in FIG. 8 as being coupled via the bus 805. However, the device 900 is not so limited. Elements of the device 900 may be coupled via one or more data transport means. For example, the processing device 910, and/or the main memory 925 may be coupled via a local microprocessor bus. The mass storage device 930, peripheral device(s) 940, portable storage medium device(s) 950, and/or graphics subsystem 960 may be coupled via one or more input/output (I/O) buses. The mass storage device 930 may be a nonvolatile storage device for storing data and/or instructions for use by the processing device 910. The mass storage device 930 can also correspond to one or more of the STT engine 312, retrieval engine 314, alias generation engine 316, and alias collection engine 310, described above. The mass storage device 930 may be implemented, for example, with a magnetic disk drive or an optical disk drive. In a software embodiment, the mass storage device 930 is configured for loading contents of the mass storage device 930 into the main memory 925. Memory may be embodied as one or more of mass storage device 930, main memory 925, or portable storage medium device 950.

Mass storage device 930 may additionally store the STT engine 312, the retrieval engine 314, the alias generation engine 316, and/or the alias collection engine 310. The mass storage device 930 may also include software that, when executed, causes the device 900 to perform the features described above, including but not limited to the functions of the STT engine 312, the retrieval engine 314, the alias generation engine 316, and/or the alias collection engine 310.

The portable storage medium device 950 operates in conjunction with a nonvolatile portable storage medium, such as, for example, a solid-state drive (SSD), to input and output data and code to and from the device 900. In some embodiments, the software for storing information may be stored on a portable storage medium, and may be inputted into the device 900 via the portable storage medium device 950. The peripheral device(s) 940 may include any type of computer support device, such as, for example, an input/output (I/O) interface configured to add additional functionality to the device 900. For example, the peripheral device(s) 940 may include a network interface card for interfacing the device 900 with a network 160. The audio input/output devices 942 may correspond to the interfaces 264, 344 and may include a microphone and/or speaker.

The input control device(s) 980 provide a portion of an interface for the device 900. The input control device(s) 980 may include a keypad and/or a cursor control and/or a touch screen. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 900 may include the graphics subsystem 960 and the output display 970. The output display 970 may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 960 receives text-based and graphical information, and processes the information for output to the output display 970, such as textual requests for uttered aliases.

Input control devices 980 can control the operation and various functions of device 900. Input control devices 980 can include any components, circuitry, or logic operative to drive the functionality of device 900. For example, input control device(s) 980 can include one or more processors acting under the control of an application.

Each component of the device 900 may represent a broad category of a computer component of a general and/or special purpose computer. Components of the device 900 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, engine, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above. Included in the programming and/or software of the system are software modules for implementing the procedures described above.

Utterance Processing

Figure 9:
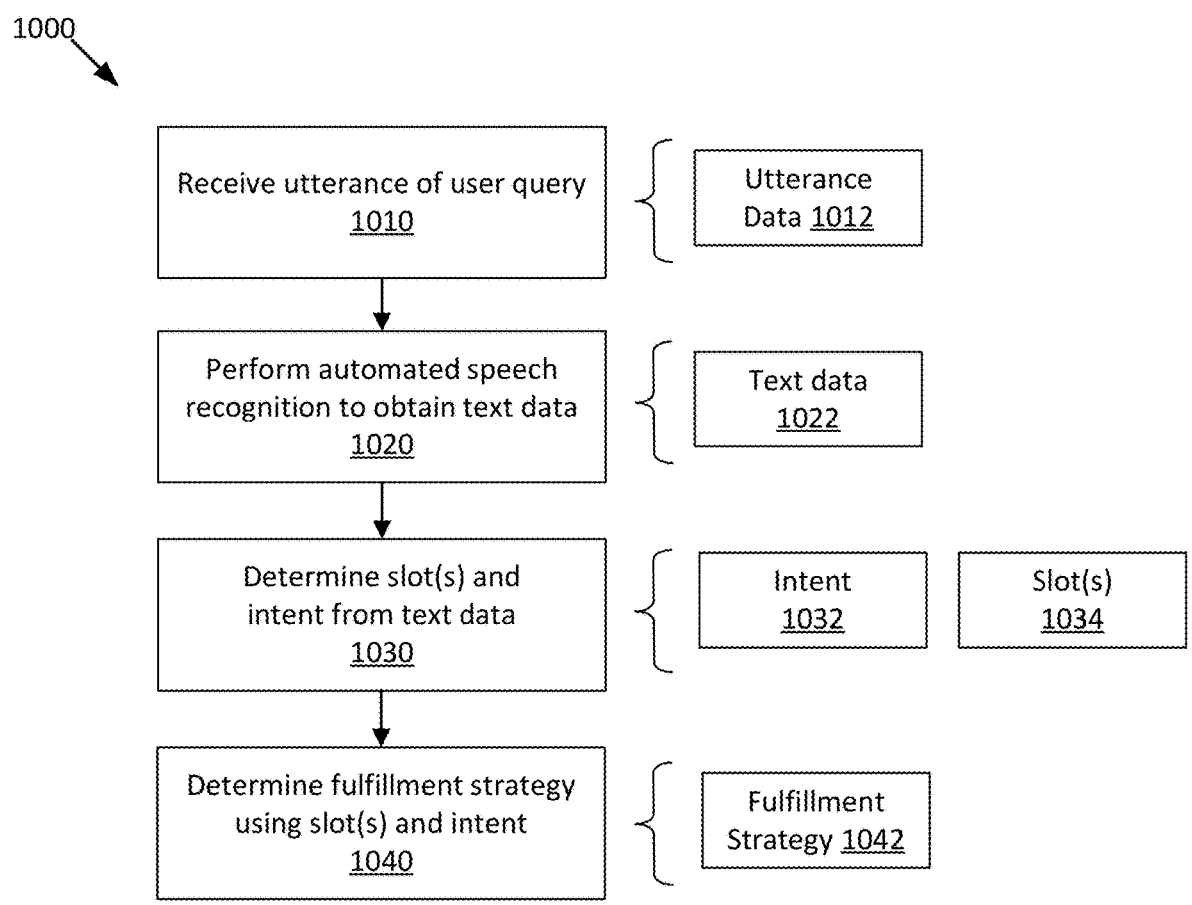
FIG. 9 is a flowchart of an example method for processing an utterance.

FIG. 9 is a flowchart of an example method 1000 for processing an utterance 130. In some embodiments, the method 1000 can be used to at least partially perform operations described elsewhere herein.

In some examples, the method 1000 is performed by the server 110. For example, the method 1000 can be used by the alias pronunciation system 106, 108 for performing a fulfillment strategy based on the utterance 130. The alias pronunciation system 106, 108 can include or implement a user command interpretation server that operates a Natural Language Understanding (NLU) system. The user device 102 can receive the utterance 130 and provide the utterance 130 to the alias pronunciation system 106, 108 for processing. This is for example purposes only, and other configurations are possible.

The method 1000 can begin at operation 1010 in which the alias pronunciation system 106, 108 receives the utterance 130. The utterance 130 can be stored and received as utterance data 1012 by the alias pronunciation system 106, 108. The utterance data 1012 is data describing the utterance 130. In at least some embodiments, the utterance data 1012 is an audio recording that contains the utterance 130 being spoken. In some examples, the utterance data 1012 is received as an entire audio data file. For instance, the user device 102 buffers the utterance data 1012 as it is obtained from a sound detection device of the user device 102. The utterance data 1012 that is buffered is then sent to the alias pronunciation system 106, 108 for processing. In other instances, the user device 102 streams the utterance data 1012 to the alias pronunciation system 106, 108 in real-time as the utterance data 1012 is received from the sound detection device of the user device 102. In some examples, the utterance data 1012 is stored (e.g., by the server 110) in a data store after it is received. After the utterance data 1012 is received, the method 1000 moves to operation 1020.

Operation 1020 includes performing automated speech recognition on the utterance data 1012 to obtain text data 1022. In some embodiments, performing automated speech recognition includes providing the utterance data 1012 as input to an automated speech recognition system (e.g., the voice recognition application) and receiving the text data 1022 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, DEEPSPEECH, maintained by the MOZILLA FOUNDATION, and Google ASR, maintained by Google, Inc. After the text data 1022 is obtained from the automated speech recognition system, the method 1000 can move to operation 1030.

Operation 1030 includes determining a slot 1034 and an intent 1032 from the text data 1022. The slot 1034 is a key-value pair that describes a portion of the text data 1022 having a specific meaning. The intent 1032 describes a general intent of the text data 1022. In the illustrated example of FIG. 1, if the text data 1022 represents "play Bl!nk" as input, the intent 1032 is "play" and the slot 1034 can include at least one key-value pair, such as {artist: Bl!nk}.

In some embodiments, the text data 1022 can include a single slot 1034 and a single intent 1032. In other embodiments, the operation 1030 can return a plurality of slots 1034 and/or a plurality of intents 1032 from the text data 1022. In yet other embodiments, the text data 1022 provides an intent 1032 but no slot 1034. For example, where the text data 1022 is "play," the operation 1030 can return the intent 1032 being "play", but will not result in any slot 1034 (e.g., the text data 1022 does not include a description of what to play). In other examples, the text data 1022 can include one or more slots 1034 but no intent. For instance, where the text data 1022 is play "Close Your Eyes by Bl!nk", the operation 1030 can result in two slots 1034 (e.g., {Song: Close Your Eyes} and {Artist: Bl!nk}) but no intent 1032 (e.g., the text data 1022 does not include a description of what do to with the song and artist, such as search, play, or save).

As described herein, the text data 1022 can include one or more descriptors. In some embodiments, the descriptors can include values of one or more of the slots 1034 identified from the text data 1022. In the illustrated example of FIG. 1, where the text data 1022 includes "play Bl!nk" converted from the utterance, the values of the slots 1034, such as "Bl!nk", can be included as descriptors of the text data 1022. In other embodiments, the descriptors of the text data 1022 can include the value of the intent 1032 (e.g., "play" in the above example). In yet other embodiments, other terms identified in the text data 1022 can be included in the descriptors of the text data 1022. In yet other embodiments, the descriptors of the text data 1022 can be identified in other methods.

In some embodiments, the operation 1030 can be performed by a natural language understanding model that is trained to identify the slot 1034 and intent 1032 for the text data 1022 provided as input. The natural language understanding model can be implemented in a variety of ways, including using a state vector machine or a conditional random fields model, among others. With the intent 1032 and the slots 1034 determined, the method 1000 can move to operation 1040.

Operation 1040 includes determining a fulfillment strategy 1042 using the slot 1034 and the intent 1032. The fulfillment strategy 1042 is a course of action to be performed to execute a command or service associated with the utterance 130, such as the intent 1032 thereof. As described herein, the fulfillment strategy 1042 can include a descriptive search service in response to the user query 120. In another example, where the intent 1032 is a play intent, the fulfillment strategy 1042 is a play fulfillment strategy and involves execution of a play command.

In some embodiments, the alias pronunciation system 106, 108 includes or cooperates with a fulfillment manager that operates to select a fulfillment strategy 1042 among a plurality of fulfillment strategies, which satisfies the received utterance 130. The plurality of fulfillment strategies can include a play fulfillment strategy, a basic search strategy (e.g., using entity-focused search), a descriptive search strategy, a recommendation strategy, and an unspecified search strategy. In some examples, the fulfillment manager follows a decision tree based the intent 1032 and the slot 1034. In other examples, each fulfillment strategy 1042 defines requirements (e.g., a play fulfillment strategy may require a play intent) and the fulfillment manager selects a fulfillment strategy among the plurality of fulfillment strategies based on whether the associated requirement is met.

Once the fulfillment strategy 1042 is selected, the fulfillment strategy 1042 is then performed by the server 110. For example, where the fulfillment strategy 1042 is determined to be a descriptive search service based on the intent 1032 and/or the slot 1034 of the text data 1022, the alias pronunciation system 106 performs descriptive media content search based on the text data 1022 (e.g., at least one of the descriptors identified from the text data 1022).

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A computer-implemented method comprising:
   receiving text data including at least one character that is a non-letter character having a standard pronunciation;
   providing the text data as input into a trained machine-learning model;
   receiving as output from the trained machine-learning model, output data indicative of a pronunciation of the text data, the pronunciation of the non-letter character being different from the standard pronunciation;
   wherein the trained machine learning model is trained using an utterance from a user, wherein the training includes:
   processing the utterance with a speech-to-text engine to identify within the utterance at least a first and a second portion;
   conducting a search to find a match to the first portion in a metadata database, the match having associated data, wherein the metadata database includes metadata which describes media content, and the metadata database includes at least the following categories of metadata: song titles, artist names, and albums, wherein the match and the associated data are each associated with different categories of the metadata in the metadata database;
   analyzing the associated data to identify an associated portion in the associated data that has a similarity to the second portion, wherein the associated portion includes a non-letter character; and
   training the machine-learning model with the associated portion as training input data and the second portion as training output data.

2. The method of claim 1, wherein training data includes text-based words and associated correct pronunciations.

3. The method of claim 2, wherein at least one of the text-based words includes a character that is a non-letter character.

4. The method of claim 2, wherein training the machine-learning model includes training the machine-learning model to produce pronunciation output based on text input.

5. The method of claim 1, wherein the similarity between the second and associated portions is determined to pass a predetermined threshold.

6. The method of claim 5, wherein the similarity is determined based on a number of characters that are the same between the second and associated portions passing the predetermined threshold.

7. The method of claim 6, further comprising:
identifying a media content item associated with the match; and
initiating playback of the media content item.

8. The method of claim 1, wherein training data includes the training output data based on a standardized phonetic representation of a spoken language.

9. The method of claim 8, wherein the standardized phonetic representation is an International Phonetic Alphabet (IPA), a Speech Assessment Methods Phonetic Alphabet (SAMPA), an Extended SAMPA (X-SAMPA), or a Speech Synthesis Markup Language (SSML).

10. The method of claim 8, wherein the training output data is formatted as a vector representation.

11. The method of claim 1, wherein the trained machine-learning model comprises a neural network.

12. The method of claim 1, further comprising:
providing the output data to a text-to-speech system for producing speech output based on the output data.

13. The method of claim 1, wherein the text data includes a text-based word having the at least one character that is the non-letter character, wherein the non-letter character appears in a location in the text-based word normally occupied by a letter.

14. The method of claim 1, further comprising storing the second portion as an alias for the associated portion in an alias database, the alias database having one or more other aliases.

15. A system comprising memory storing instructions that, when executed by one or more processors, cause the one or more processors to:
receive text data including at least one character that is a non-letter character, the text data including at least one word that is spelled differently than a standard spelling;
provide the text data as input into a trained machine-learning model; and
receive as output from the trained machine-learning model, output data indicative of a pronunciation of the text data, the pronunciation corresponding to the standard spelling of the at least one word;
wherein the trained machine learning model is trained using an utterance from a user, wherein the training includes instructions that, when executed by the one or more processors, cause the one or more processors to:
process the utterance with a speech-to-text engine to identify within the utterance at least a first and a second portion;
conduct a search to find a match to the first portion in a metadata database, the match having associated data, wherein the metadata database includes metadata which describes media content, and the metadata database includes at least the following categories of the metadata: song titles, artist names, and albums, wherein the match and the associated data are each associated with different categories of the metadata in the metadata database;
analyze the associated data to identify an associated portion in the associated data that has a similarity to the second portion, wherein the associated portion includes a non-letter character; and
train the machine-learning model with the associated portion as training input data and the second portion as training output data.

16. The system of claim 15, further comprising media streaming application instructions stored in a non-transitory memory of a voice-interactive device executable to cause operation of a media streaming application on the voice-interactive device.

17. The system of claim 15, wherein training data includes text-based words and associated correct pronunciations.

18. The system of claim 17, wherein training data includes at least a portion of the text-based word identified as having a correct pronunciation different than a phonetic pronunciation.

19. The system of claim 17, wherein training the machine-learning module includes training the machine-learning module to produce pronunciation output based on text input.

20. A computer-implemented method comprising:
receiving an utterance from a user;
obtaining text data from the utterance;
providing the text data as input into a trained machine-learning model; and
receiving as output from the trained machine-learning model, output data including alternative text data based on the utterance, the alternative text data including at least one character that is a non-letter character, the alternative text data being associated with a pronunciation of the utterance; and
wherein the trained machine learning model is trained using the utterance, wherein the training includes:
processing the utterance with a speech-to-text engine to identify within the utterance at least a first and a second portion;
conducting a search to find a match to the first portion in a metadata database, the match having associated data, wherein the metadata database includes metadata which describes media content, and the metadata database includes at least the following categories of the metadata: song titles, artist names, and albums, wherein the match and the associated data are each associated with different categories of the metadata in the metadata database;
analyzing the associated data to identify an associated portion in the associated data that has a similarity to the second portion, wherein the associated portion includes a non-letter character; and
training the machine-learning model with the associated portion as training input data and the second portion as training output data.

* * * * *